United States Patent [19]

Murray, Jr. et al.

[11] 4,153,080

[45] May 8, 1979

[54] FIRE HOSE AND METHOD OF MAKING IT

[75] Inventors: William S. Murray, Jr., Rumson; Clarence W. Borden, Trenton, both of N.J.

[73] Assignee: Goodall Rubber Company, Trenton, N.J.

[21] Appl. No.: 896,113

[22] Filed: Apr. 13, 1978

[51] Int. Cl.² .................... F16L 11/12; F16L 11/02
[52] U.S. Cl. ................................. 138/126; 239/34; 239/145; 83/30
[58] Field of Search .............. 138/103, 125, 126, 178; 239/34, 43, 145, 547; 264/155, 156; 156/253; 83/30, 54, 660

[56] References Cited

U.S. PATENT DOCUMENTS

| 2,329,836 | 9/1943 | Huthsing | 138/126 |
| 2,754,848 | 7/1956 | Knowland et al. | 138/125 |
| 2,833,313 | 5/1958 | Penman | 138/125 |
| 3,056,429 | 10/1962 | Wilberg | 138/126 |
| 3,830,067 | 8/1974 | Osborn et al. | 239/145 |
| 4,010,298 | 3/1977 | Angle | 138/103 |

FOREIGN PATENT DOCUMENTS

| 726520 | 1/1966 | Canada | 239/145 |
| 1049978 | 11/1966 | United Kingdom | 138/125 |

Primary Examiner—Richard R. Stearns
Attorney, Agent, or Firm—Beveridge, DeGrandi, Kline & Lunsford

[57] ABSTRACT

A firefighting hose has an exposed woven textile jacket and an internal elastomer lining which has openings each of which is formed of a set of radiating cracks. In use, water emerging from the openings is absorbed in the jacket to protect the hose from flame and ember damage. The hose is formed by forming and uniting the jacket and lining, and making the openings by penetrating the hose with a reciprocating needle.

21 Claims, 5 Drawing Figures

FIRE HOSE AND METHOD OF MAKING IT

BACKGROUND AND SUMMARY

This invention relates to hoses wherein water from the interior of the hose weeps through the hose wall to wet a textile exterior surface of the hose, thereby protecting the hose from damage when contacted by embers or flames.

Many hoses for fighting forest fires have been made of unlined linen which becomes wet in the course of ordinary use to resist damage from embers and flames. Such hoses have a textured interior wall which produces substantial hydraulic friction losses and pressure drops, creating difficulties in delivering sufficient pressures and quantities of water to the nozzle. While in use, the rate of water leakage decreases progressively to reduce the fire resistance of the hose. After the fire is extinguished, such hoses become somewhat rigid due to swelling of the linen, making it difficult to get the hoses from the fire site to a location where they can be dried for storage. Unless properly dried and stored, such hoses are also susceptible to mildew damage.

There also have been woven water-pervious hoses interiorly coated or lined with a minutely porous plastic film. Fabrication of such hoses is extremely difficult and requires special machinery. Further, minerals or water pollutants in some areas block the minute pores in the lining, leaving the textile hose covering dry and subject to fire damage.

The present invention relates to a weeping hose which has an external exposed tubular jacket formed of water absorbent textile material, an internal elastomer tube formed of water impermeable material which lines the textile jacket, and water-releasing openings in the elastomer tube, such openings being formed of spaced apart sets of radiating cracks in the elastomer lining. The edges of the cracks are normally in contact with each other but are separable to permit water to pass from the interior of the hose into the jacket when the tube is subjected to internal hydrostatic pressure. The sets of cracks are appropriately spaced to produce wetting of substantially all of the external jacket when the interior of the hose is subjected to normal firefighting hydrostatic pressures.

The hose forming method involves the driving of a needle through spaced apart locations on a tubular body formed of an internal elastomer tube covered by an external exposed jacket of water absorbent textile material. Penetration of the needle forms a plurality of spaced apart sets of radiating cracks in the tube which enable water under hydrostatic pressure to pass from the interior of the tube into the jacket where it is absorbed to protect the jacket from fire damage.

THE DRAWINGS

DECRIPTION OF A PREFERRED EMBODIMENT

Figure 1:
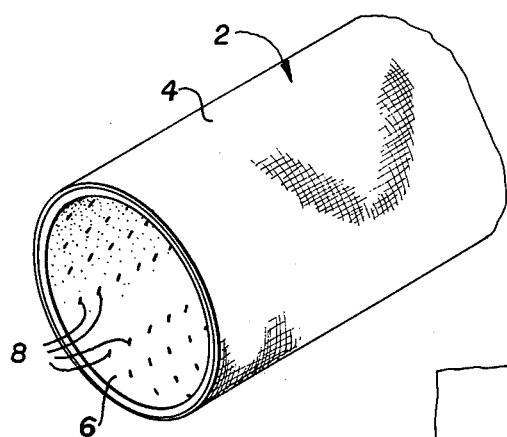
FIG. 1 is a perspective view of a portion of the hose in the configuration assumed during use.
Figure 3:
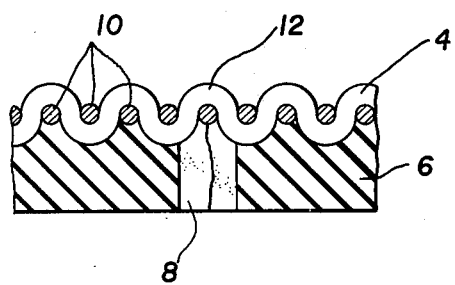
FIG. 3 is a sectional view along the line 3—3 in FIG. 2.

As seen in FIG. 1, the hose 2 is formed of an external exposed tubular textile jacket 4 lined with an elastomer tube 6. The internal tube is intimately bonded to the tubular jacket as shown in FIG. 3, with surface projections of the internal tube extending into the recesses which exist on the interior surface of the textile jacket. The tubular lining 6 has a series of openings 8 which release water from the interior of the hose 2 into the textile jacket 4, wetting substantially all of the jacket 4 to protect it from ember and flame damage when fighting forest fires. The average longitudinal and circumferential spacing between the openings 8 is no more than about ¼ inch.

Figure 2:
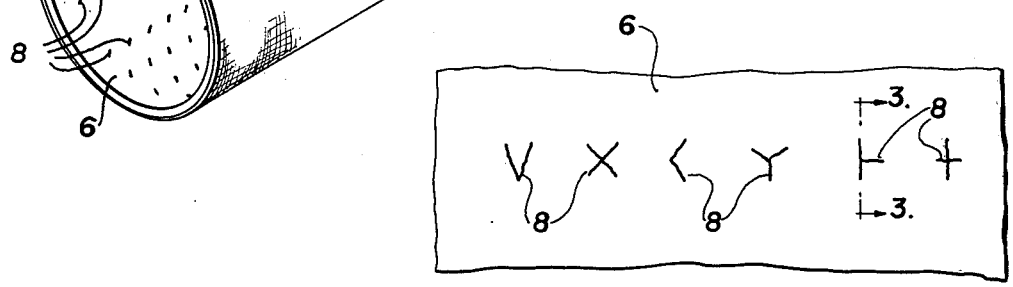
FIG. 2 depicts various shapes of the water-releasing openings in the elastomer lining of the hose.

In the significantly enlarged view shown in FIG. 2, it will be seen that these openings 8 take many forms, all of which include a set of radiating cracks, the edges of which are normally in contact with each other. When the tube is subjected to internal hydrostatic pressure, the edges of the cracks separate to permit water to pass from the interior of the hose into the textile jacket. The length of each crack, i.e. the distance from its point of intersection with the other cracks which form the opening, is preferably less than the wall thickness of the tube and no greater than about 1/32 inch.

The textile jacket 4 is preferably formed by interwoven warp yarns 10 and filler yarns 12 providing substantially a 100% covering of the elastomer tube 6 so that there are no visible openings in the jacket. When the jacket 4 is so arranged, the textile materials will lie in the path of water passing through the openings 8 of tube 6 whereupon the capillarity of the textile materials will distribute the water throughout the jacket 4 and the absorbency of the textile fibers will retain the water in the jacket.

The rate of water leakage through openings 8 is dependent upon a number of factors including water pressure, the size and spacing of openings 8, the tightness of the weave and the composition of the textile fibers in the jacket. Excessive leakage of a given hose may be avoided by reducing the pressure. However, even when leakage is excessive, the hose remains fire resistant and is capable of delivering more water at higher pressure than a comparable unlined linen hose.

In a preferred manufacturing process, the textile jacket 4 is woven separately in a conventional loom such as those made and sold by the Mandal Company. For a tube having a diameter of about 1½ inch, the warp is formed of 340 ends of 8/6 cotton yarn, eight ends being wound six ply. The circumferential or filler yarn is 1100-4 polyester. The machine is set up to produce 28.5 picks of the filler for each 3" length of the jacket. To maximize absorbency, the jacket may be woven of cotton warp and filler yarns, since cotton has a greater water absorbency than synthetic materials. A woven jacket is preferable to a knit construction as it is capable of exerting inward radial reaction forces which resist the expansion of the lining and outward flexing or bending of the lining material in the vicinity of of the openings 8.

The lining tube 6 is extruded from suitable thermosetting or thermoplastic elastomers such as natural rubber, GRS rubber, or plastic compositions such as the polyester elastomer sold under the trademark Hytrel. Rubber compositions are compounded to prevent resealing of the openings 8 by loading the composition with carbon black, clay and kaolin. The extruded tube is then covered with a layer of tie gum 0.020 inch thick and pulled into the textile jacket. The ends of the tube are sealed and internal fluid pressure is applied to deform the material of tube 6 outwardly into intimate contact with the interior of the textile jacket 4. When the tube 6 is made of thermosetting materials such as uncured rubber, a heated pressure medium such as steam is desirable as it performs the dual functions of expanding and curing the tube 6. The external surface of the lining tube 6 is deformed to conform to the internal surface of the textile jacket 4 as shown in FIG. 2. After expansion and vulcanization are completed, the hose is cooled and couplings are attached to its ends. The hose is rolled for storage, ordinary use or subsequent processing to enable it to serve as weeping hose according to the invention.

Figure 5:
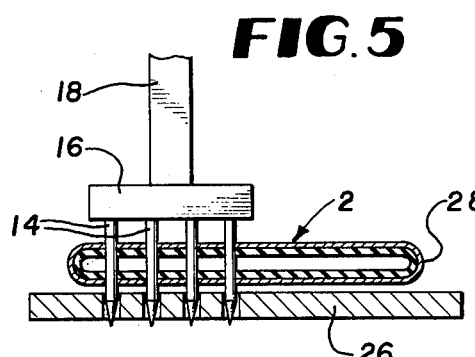

The weeping characteristics are imparted to the hose by passing it through a machine which drives needles through the hose to form the openings 8. Such a machine shown diagramatically in FIGS. 4 and 5 includes a plurality of needles 14 attached to a needle bar 16 on a plunger 18 which reciprocates vertically in a guide tube 20. A connecting rod 22 has its lower end pivotally connected to the plunger 18 and its upper end pivotally connected to a crank pin on flywheel 24 which is rotated by an electric motor. The hose is supported on a needle plate 26 which has appropriate openings which accommodate the extended needles as shown in FIG. 5. Rotation of the flywheel will cause the needles 14 to reciprocate vertically from a retracted position above the hose 2 to an extended position where they extend through the hose and through openings in the needle plate 26.

Figure 4:
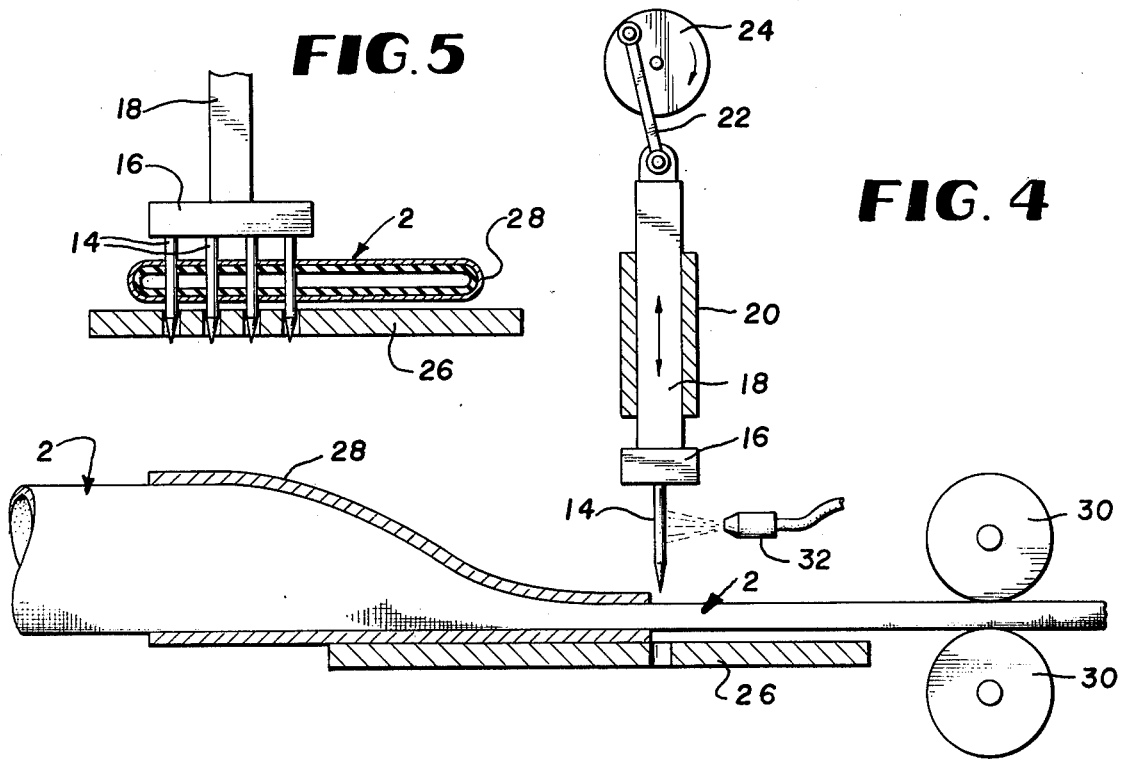
FIG. 4 is a diagrammatic view showing the method of forming the hose of this invention from conventional hose stock; and, FIG. 5 is a transverse sectional view of the method of FIG. 4.

As shown in FIG. 4, the unperforated hose is led through a rigid flattening tube 28 onto the needle plate 26 and into the path of the reciprocating needles 14. Forwardly of the needles 14, feed wheels 30 engage the top and bottom of the flattened hose and drive it forward in an intermittent fashion, the wheels 30 rotating to advance the hose only during the time period when the needles 14 are retracted from the hose. This technique avoids lateral movement of the needles relative to the jacket yarns, and therefore does not reduce the burst strength of the hose.

As shown in FIG. 5, the needles 14 are driven downwardly through two layers of the hose to form the openings 8 previously described. The hose is then run through the machine a second time to provide the openings on the other side. Alternatively two or more sets of needles could be used to provide the openings on the entire hose.

The needling operation may be performed by conventional single or multiple needle sewing machines, examples of the latter being commercially available from the Puritan Manufacturing Division of the Torrington Company, Torrington, Conn., and L. F. Fales Machine Company of Walpole, Mass. Experience has shown that needles having a diameter of 3/64 inch are particularly well suited to this manufacturing operation. Also, it has been found that there is less abrasvie removal of the elastomer material if the needles 14 when retracted are sprayed by a nozzle 32 with a silicone lubricant. Such a composition, including kerosene, is sold under the designation S-52 by Specialty Products Company, 15 Exchange Place, Jersey City, N.J. 07302.

From the foregoing, it will be appreciated that this invention presents significant improvements in the construction and manufacture of ember and flame-resistant hoses useful for fighting forest fires. Those skilled in the art will realize that the disclosed embodiment is susceptible to numerous modifications. Therefore, it is emphasized that the invention is not limited only to the embodiment disclosed herein but is embracing of other structures and methods falling within the spirit of the following claims.

We claim:

1. A weeping hose, comprising,
   an external exposed tubular jacket formed of water absorbent textile material, said jacket being formed of intertwined strands of textile material in contact with each other to present no visible openings in said jacket,
   an internal elastomer tube lying against the interior surface of said jacket, said tube having a wall formed of water impermeable material, spaced apart sets of radiating cracks in said wall for releasing water into said jacket, said cracks having edges which are normally in contact with each other but are separable to permit water to pass therebetween when the tube is subjected to internal hydrostatic pressure, said sets of cracks being spaced apart a distance to produce wetting of substantially all of the external jacket when the interior of the hose is subjected to hydrostatic pressure.

2. The weeping hose of claim 1 wherein said cracks have a length no greater than about 1/32 inch.

3. The weeping hose of claim 1 wherein said cracks have a length which is less than the wall thickness of said elastomer tube.

4. The weeping hose of claim 1 wherein said tubular jacket is a woven tube.

5. The weeping hose of claim 1 wherein said internal tube is intimately bonded to said tubular jacket and has projections thereon extending into said tubular jacket.

6. The weeping hose of claim 1 wherein the spacing between said sets of cracks is no more than about ¼ inch.

7. The weeping hose of claim 1 wherein the tubular jacket is a woven tube, said internal tube being intimately bonded to said tubular jacket and having projections thereon extending into said tubular jacket, said sets of cracks being spaced apart a distance no greater than about ¼ inch, said cracks having a length no greater than about 1/32 inch.

8. A weeping hose, comprising,
   an external exposed tubular jacket formed of water absorbent textile material, said jacket being formed of intertwined strands of textile material in contact with each other to present no visible openings in said jacket,
   an internal elastomer tube lying against the interior surface of said jacket, said tube having a wall formed of water impermeable material, spaced apart sets of radiating cracks in said wall for releasing water into said jacket, said cracks having been formed by penetrating said wall with a needle without removing any material from said wall.

9. The weeping hose of claim 8 wherein said cracks have a length no greater than about 1/32 inch.

10. The weeping hose of claim 8 wherein said cracks have a length which is less than the wall thickness of said elastomer tube.

11. The weeping hose of claim 8 wherein said tubular jacket is a woven tube.

12. The weeping hose of claim 8 wherein said internal tube is intimately bonded to said tubular jacket and has projections thereon extending into said tubular jacket.

13. The weeping hose of claim 8 wherein the spacing between said sets of cracks is no more than about ¼ inch.

14. The weeping hose of claim 8 wherein the tubular jacket is a woven tube, said internal tube being intimately bonded to said tubular jacket and having projections thereon extending into said tubular jacket, said sets of cracks being spaced apart a distance no greater than about ¼ inch, said cracks having a length no greater than about 1/32 inch.

15. A method of forming a weeping hose from a tubular body which has an internal elastomer tube covered by an external exposed jacket of water absorbent textile material, said method being performed by driving a needle through spaced apart points of said tubular body, said needle penetrating said jacket and said elastomer tube to form in the tube a plurality of spaced apart sets of radiating cracks which in use enable water under hydrostatic pressure to pass from the interior of said elastomer tube into said jacket where it is absorbed to protect the jacket from fire damage.

16. The method of claim 15 wherein said sets of cracks are spaced apart a distance no greater than about ¼ inch.

17. The method of claim 15 wherein the tubular body is held flat as the needle is driven therethrough whereby the flattened tubular body has a double thickness, said needle being driven through the entire flattened tubular body to form said sets of cracks in both thickness thereof.

18. The method of claim 15 wherein the needle has a thickness of about 3/64 inch.

19. The method of claim 15 wherein the needle is driven along its longitudinal axis and is withdrawn from the tubular body between successive penetrations, said tubular body being advanced in a direction which is transverse to said longitudinal axis when the needle is withdrawn from the tubular body.

20. The method of claim 15 including the step of applying a lubricant to the needle before driving it through said tubular body.

21. The method of claim 15 wherein the needle has a thickness of about 3/64 inch and the space between said sets of cracks is no more than about ¼ inch, said needle being driven along its longitudinal axis and being withdrawn from said tubular body between successive penetrations, applying a lubricant to the needle and advancing said tubular body in a direction which is transverse to said longitudinal axis when the needle is withdrawn from the tubular body.

* * * * *